(12) United States Patent
Shepherd et al.

(10) Patent No.: US 12,516,829 B2
(45) Date of Patent: Jan. 6, 2026

(54) EVAPORATOR UNIT FOR AN AIR CONDITIONING SYSTEM

(71) Applicant: CHARLES AUSTEN PUMPS LTD., Surrey (GB)

(72) Inventors: William Eric Shepherd, Surrey (GB); Andrew Green, Surrey (GB)

(73) Assignee: CHARLES AUSTEN PUMPS LTD., Surrey (GB)

( * ) Notice: Subject to any disclaimer, the term of this patent is extended or adjusted under 35 U.S.C. 154(b) by 210 days.

(21) Appl. No.: 18/267,673

(22) PCT Filed: Dec. 17, 2021

(86) PCT No.: PCT/EP2021/086464
§ 371 (c)(1),
(2) Date: Jun. 15, 2023

(87) PCT Pub. No.: WO2022/129509
PCT Pub. Date: Jun. 23, 2022

(65) Prior Publication Data
US 2024/0060660 A1    Feb. 22, 2024

(30) Foreign Application Priority Data
Dec. 18, 2020   (GB) ..................... 2020146

(51) Int. Cl.
*F24F 1/0071*     (2019.01)
*F24F 8/22*       (2021.01)
*F24F 13/22*      (2006.01)
(52) U.S. Cl.
CPC .............. *F24F 1/0071* (2019.02); *F24F 8/22* (2021.01); *F24F 13/222* (2013.01); *F24F 2013/228* (2013.01)

(58) Field of Classification Search
CPC ........ F24F 8/22; F24F 13/22; F24F 2013/227; F24F 2013/228; F24F 1/0071
See application file for complete search history.

(56) References Cited

U.S. PATENT DOCUMENTS 4,255,937 A * 3/1981 Ehrlich ................. F25D 31/002
                                                    62/291
5,768,905 A * 6/1998 Oh ........................ F25D 23/126
                                                    62/264

(Continued)

FOREIGN PATENT DOCUMENTS

CN       101463616 A      6/2009
CN       201334687 Y     10/2009

(Continued)

OTHER PUBLICATIONS

Examination Report in related application GB2020146.3 dated Jul. 30, 2024.

(Continued)

*Primary Examiner* — Tavia Sullens
(74) *Attorney, Agent, or Firm* — Patterson + Sheridan, LLP

(57) ABSTRACT

An evaporator unit for an air conditioning system (1), the unit comprising an evaporator coil (7), a sensor (12) in to detect the liquid level in a reservoir and a pump for pumping condensate from the housing. At least one UV LED (6,8) is arranged to radiate light onto the evaporator coil (7) and/or the sensor (12). An LED driver (13) supplies electrical power to the LEDs. A single electrical power connection (14) is connectable to a mains power source to supply mains power to the pump; wherein the LED driver (13) is connected to the electrical power connection supplying power to the pump.

8 Claims, 7 Drawing Sheets

(56) References Cited

U.S. PATENT DOCUMENTS

| | | | |
|---|---|---|---|
| 6,182,453 B1 | 2/2001 | Forsberg | |
| 2005/0284167 A1 | 12/2005 | Morgan et al. | |
| 2016/0265795 A1* | 9/2016 | Kopp | F24F 6/043 |
| 2017/0234717 A1* | 8/2017 | Tsuboi | G01F 1/661 |
| | | | 73/291 |
| 2020/0196413 A1* | 6/2020 | Ellis | F24F 8/22 |

FOREIGN PATENT DOCUMENTS

| | | | | |
|---|---|---|---|---|
| CN | 107883476 A | | 4/2018 | |
| CN | 109654627 A | | 4/2019 | |
| CN | 209763350 U | | 12/2019 | |
| GB | 2269455 A | * | 2/1994 | ......... G01F 23/2925 |
| KR | 20170132381 A | | 12/2017 | |
| KR | 20200085100 A | | 7/2020 | |
| WO | 2012009024 A1 | | 1/2012 | |

OTHER PUBLICATIONS

Hessling et al.; Efficient Disinfection of Tap and Surface Water with Single High Power 285 nm LED and Square Quartz Tube; Photonics 2016, 3(1), 7; www.mdpi.com/2304-6732/3/1/7 (accessed Aug. 29, 2024).

United Kingdom Search Report in related application GB 2020146.3 dated Jun. 1, 2021.

United Kingdom Search Report in related application GB 2020146.3 dated Jul. 30, 2021.

International Search Report and Written Opinion in related application PCT/EP2021/086464 dated May 3, 2022.

* cited by examiner

Section A-A

EVAPORATOR UNIT FOR AN AIR CONDITIONING SYSTEM

The present invention relates to an evaporator unit for an air conditioning system.

Air conditioning systems are well known in the art in which an evaporator unit inside a building is connected to a compressor unit which is mounted externally of the building.

The evaporator unit may be wall or ceiling mounted, or may be fixed to a floor or free standing. Such air conditioning unit systems are efficient and are effective in providing cooling for a single space (i.e. in a non-centralised air conditioning system).

The evaporator unit has a wall mountable housing containing an evaporator coil through which a coolant is pumped. A fan drives the flow of air across the evaporator coil and out of an outlet of the housing in order to provide a flow of cool air into the room to be cooled.

Dangerous pathogens can grow on the evaporator coil and become entrained in the air flow through the evaporator unit. One known way of treating this is to use ultra violet light, The use of UV lamps in this way is known in other applications as described, for example, in CN209763350, CN109654627, US2005/284167, CN201334687, CN101463616 and WO2012/009024.

In an evaporator unit UV-C light is used. This is effective in killing 99% of viruses, bacteria and molds. In order to do this, it is known to fit an array of UV-C light emitting diodes (LEDs) which are directed towards the evaporator coil and towards the air flow path through the evaporation unit. These are provided as a retro fit for an existing evaporator unit.

However, this creates a practical problem in that the air conditioning units are installed by air conditioning engineers. On the other hand, the LED system requires installation by an electrician. To fit the LEDs, the evaporator unit needs to be provided with a second mains power supply. Once an air conditioning engineer has fitted the evaporator, the electrician will connect the LEDs and their associated power supply. This is time consuming and presents a logistical issue in ensuring the correct personnel are available at the correct time. As a result, these are not currently widely used.

In evaporator units, a sensor is provided in the reservoir to measure the condensate level in the reservoir and to trigger the operation of the pump to empty the reservoir. Impurities in the water can gather and build up around the sensor which can eventually cause it to clog up and cease to function.

The present invention aims to simplify this cumbersome process and/or deal with the clogged sensor problem.

According to the present invention, there is provided a wall mounted evaporator unit for an air conditioning system according to claim 1.

The above described arrangement, requires only a single electrical connection to the mains power source. This allows the air conditioning unit, the LEDs, and their power supply to be installed only by an air conditioning engineer, thereby significantly streamlining the installation process.

The ease with which the present invention allows a UV LED to be incorporated into the evaporator unit means that the UV LEDs can more readily be deployed in areas where they have not previously been used, such as in the vicinity of the reservoir sensor.

The at least one LED and LED driver may be permanently installed within the unit. However, preferably, the at least one LED and LED driver are removably attached within the housing and the electrical connection from the LED driver to the electrical power connection supply power to the pump is in the form of a removable plug which plugs into a socket associated with the electrical power connection supplying power to the pump. This allows the LED and LED driver to be removed from the unit and replaced for maintenance reasons, while retaining the advantage of the present invention concerning the ease of installation of the initial unit.

The ease with which the present invention allows a UV LED to be incorporated into the evaporator unit means that the UV LEDs can more readily be deployed in areas where they have not previously been used.

This forms a second aspect of the present invention, according to which there is an evaporator unit for an air conditioning system according to claim 6.

As far as we are aware, in an evaporator unit of an air conditioning system, it is not known in the art to use a non-chemical means to keep the residual liquid in the reservoir free of organic growth and other contaminants.

The problem of such contaminants can be addressed to some extent by using a self-priming pump, such as a rotary diaphragm pump, which is capable of dry running in order to reduce the amount of water in the reservoir as much as possible. However, the reservoir will contain water between pump operations and, even when the pump is run this does not remove all traces of water from the reservoir. As such, the best protection against contaminants is a combination of the present evaporator unit with a self-priming pump as the UV LEDs deal with the small amount of contaminant which would otherwise arise on the sensor.

However, if anything, there is greater need for the present evaporator unit on a non-self-priming pump as there is always a significant amount of residual water in the reservoir and the amount of contaminant is a more significant problem.

An example of an evaporator unit in accordance with the present invention will now be described with reference to the accompanying drawings, in which.

Figure 1:
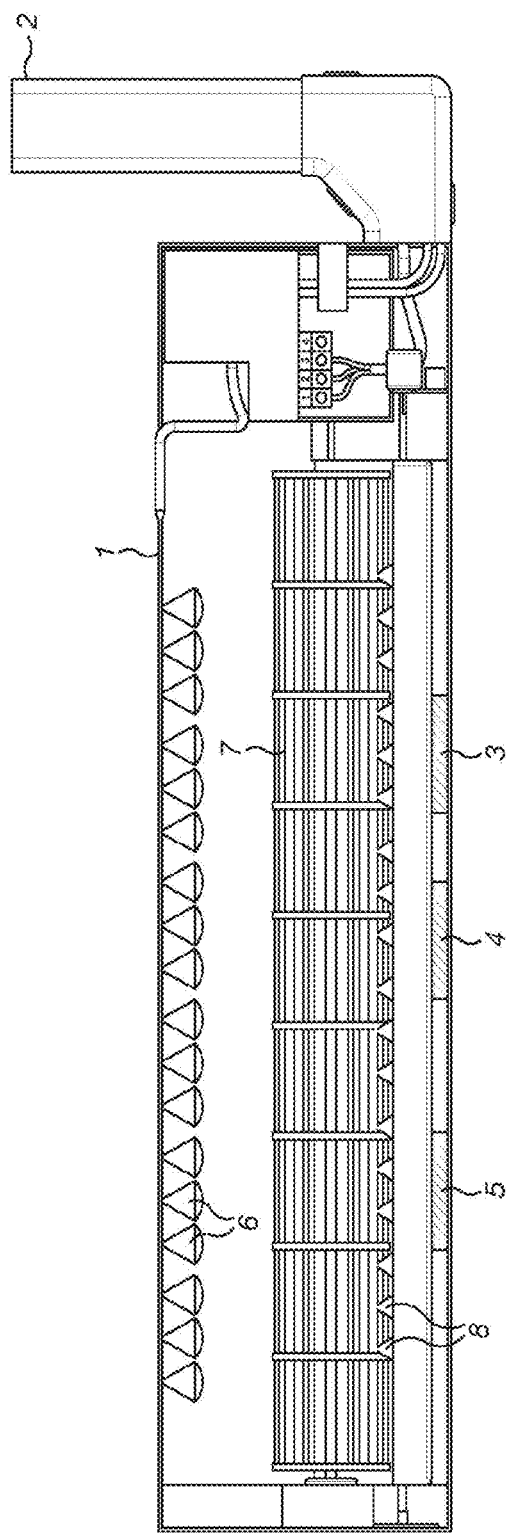
FIG. 1 is a schematic front view of a known unit with LEDs fitted.

The evaporator unit, shown in FIG. 1 is well known in the art and is designed to be mounted on an internal wall of the room. This connects to a compressor unit external of the building to create a refrigeration circuit as is well known in the art. The invention may equally be applied to a ceiling or floor mounted unit or a freestanding unit.

The unit comprises a housing 1 which is mountable to a wall and has a duct 2 to provide external connection for an air intake, the pipe (not shown) for the discharge of condensate and a 230 volt mains power supply connected to the pump 3. The pump is configured to pump condensate from a reservoir 4 once the level exceeds a predetermined amount.

The conventional unit has been fitted with a first array 6 of the UV-C LEDs arranged above an evaporator coil 7 and a second array 8 arranged below the evaporator coil 7. These are supplied on adhesive strips that are adhered in place within the housing.

Preferably the UV LED emits light with a wavelength of from 100 to 280 nm which is the germicidal part of the spectrum. More preferable the LED emits light with a wavelength of from 200 to 280 nm, as this is the more effective part of the germicidal spectrum. This is the UV-C part of the spectrum (although some of the emitted light may have a wavelength outside of that range).

Figure 3:
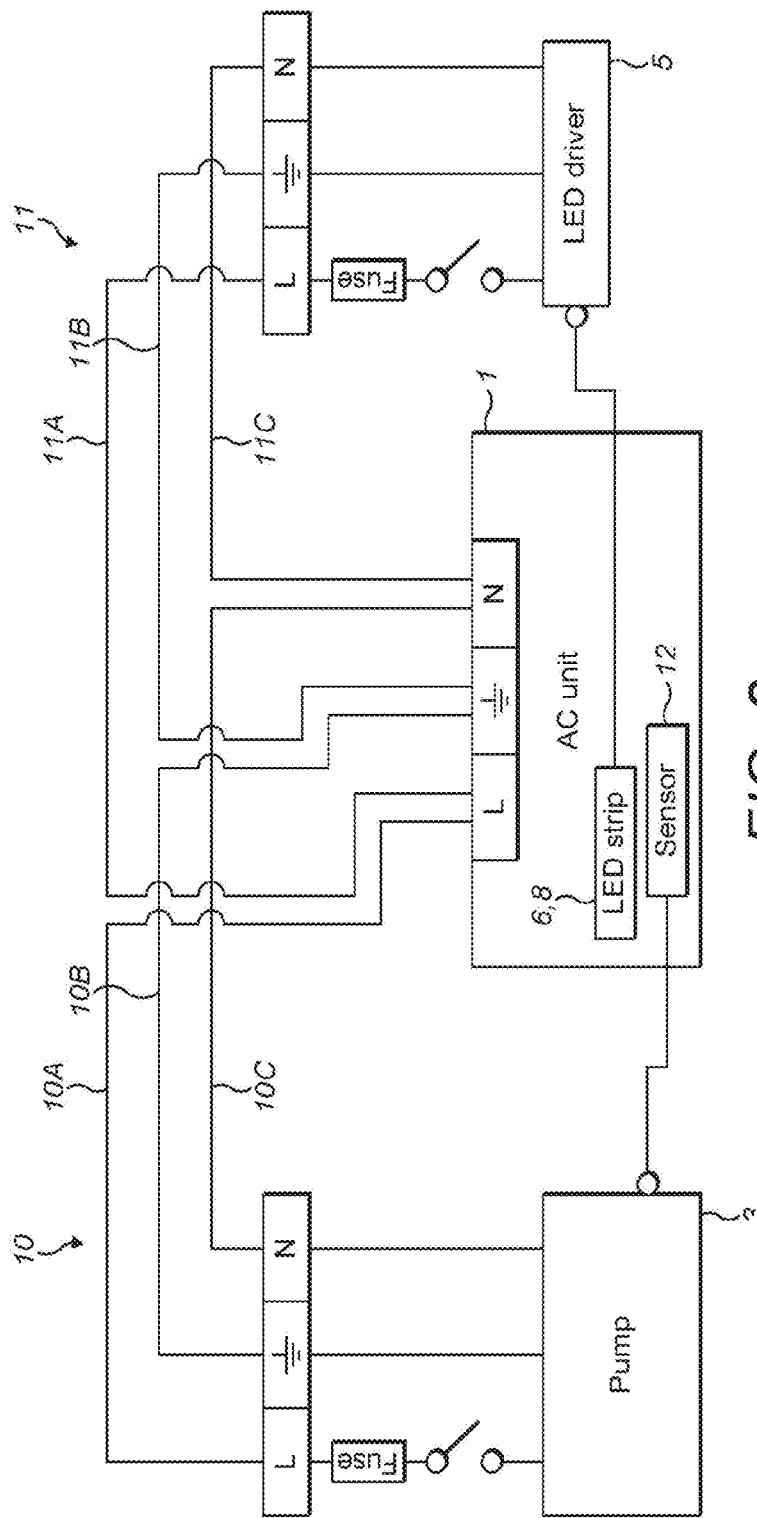
FIG. 3 is a schematic drawing of a conventional power supply.

The wiring for this conventional unit is shown in FIG. 3. As shown, the pump 3 and LED driver 5 have their own separate 230 volt power supplies. The first power supply 10 supplies the pump via live 10A, earth 10B and neutral 10C lines. The second power supply 11 supplies power to the LED driver 5 via live 11A, earth 11B, and neutral 11C lines. This second power supply needs to be installed subsequently by an electrician.

The LED driver 5 supplies power to the LED strips 6, 8, while the pump receives signals form a sensor 12 to control the flow of the condensate from the reservoir.

Figure 2:
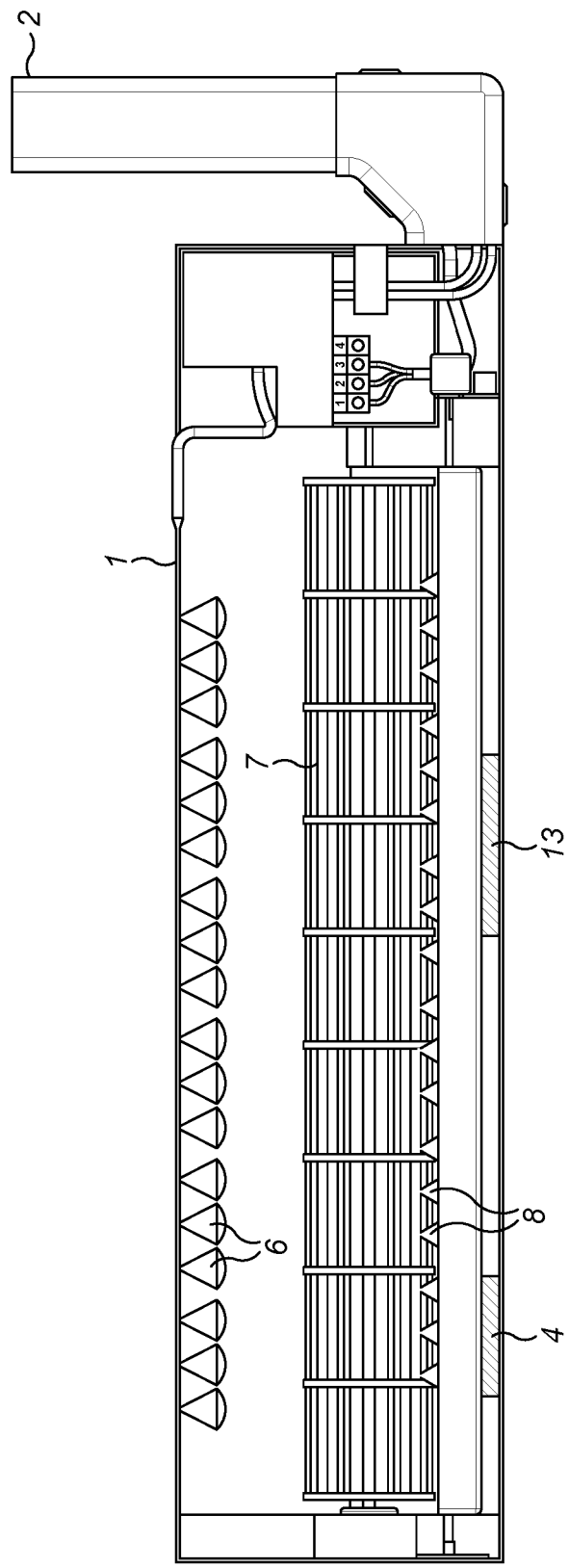
FIG. 2 is a similar view showing a unit according to the present invention.
Figure 4:
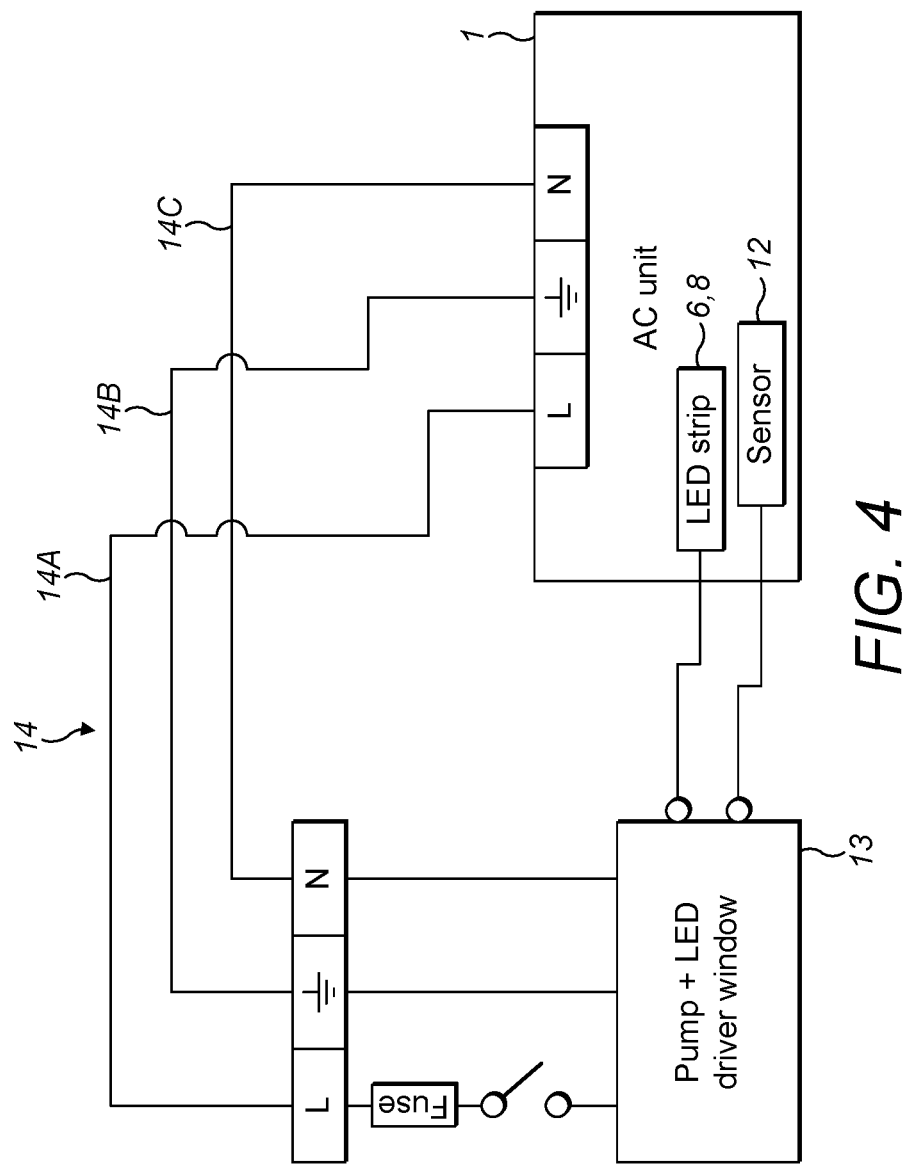
FIG. 4 is a similar view of the power supply according to the present invention.
Figure 5:
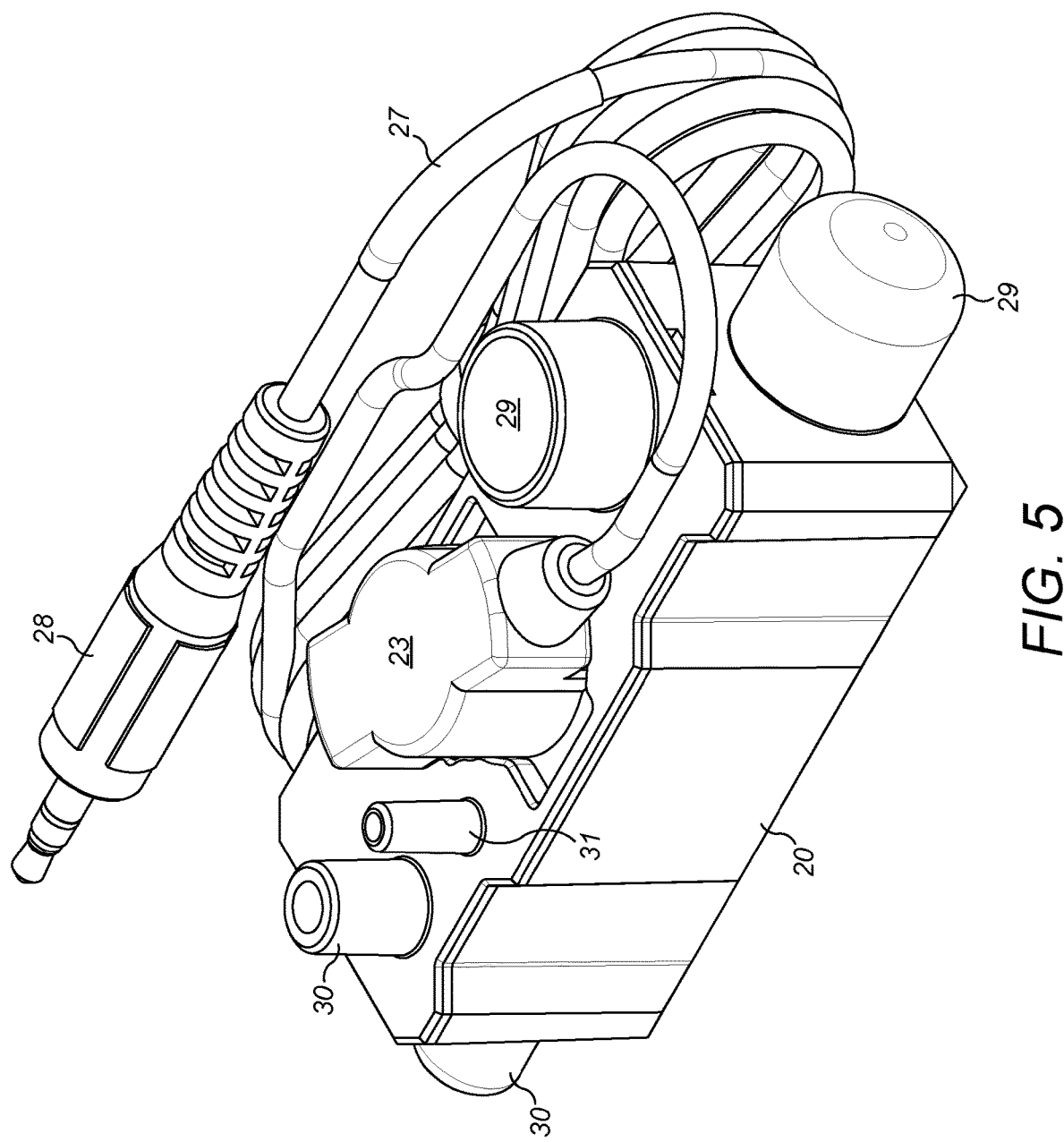
FIG. 5 is a perspective view of a reservoir for use in the unit.

As shown in FIG. 2, the present invention uses the same basic set up of the unit. One of the strengths of the invention is that it can readily be incorporated into an existing unit. Rather than requiring the fitting of a second 230 volt power supply, the unit now uses the existing power supply as the LED driver is combined into the same unit 13 as the pump. As shown in FIG. 4, the two power supplies 10, 11 are replaced by a single power supply 14, having live 14A, earth 14B, and neutral 14C lines. In practice, the power supply for the LED driver is provided with a plug which plugs into a corresponding socket in the pump housing or elsewhere to complete the power supply to the LEDs 6, 8.

The unit may be sold without the LED strips 6, 8 in place. These can be fitted either by an air conditioning engineer at the time of installation, or can be fitted later. This simply requires the LED strips to be fixed in place, for example, using an adhesive mounting and the LED driver to be plugged into the socket. Alternatively, the LED strips and driver may be preinstalled in the unit prior to installation.

In either event, the unit can be installed by an air conditioning engineer without the involvement of the electrician.

The reservoir 4 and sensor 12 are shown in greater detail in FIGS. 5 to 8.

The reservoir comprises a tank 20 closed by a lid 21. A number of components are mounted in the lid 21.

Figure 6:
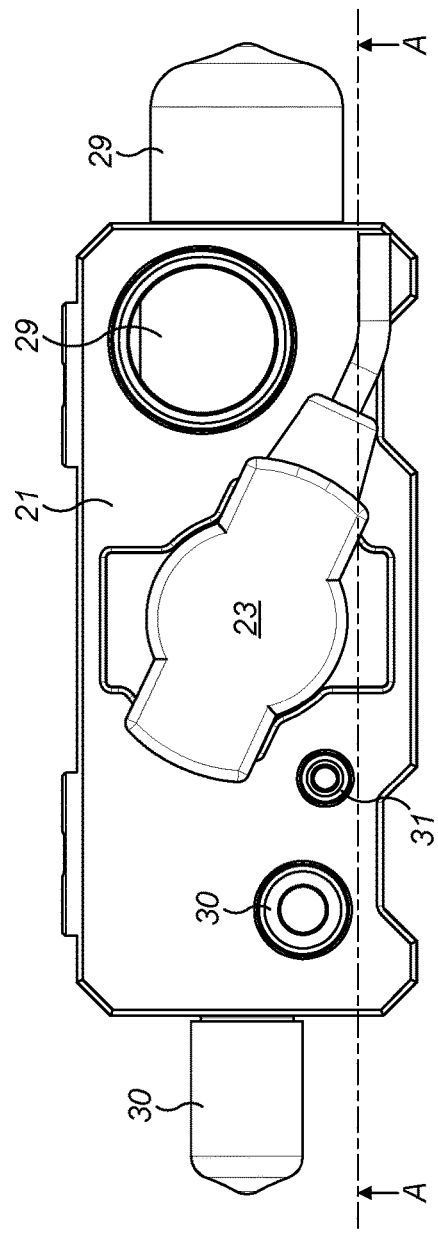
FIG. 6 is a plan view of the reservoir.
Figure 6A:
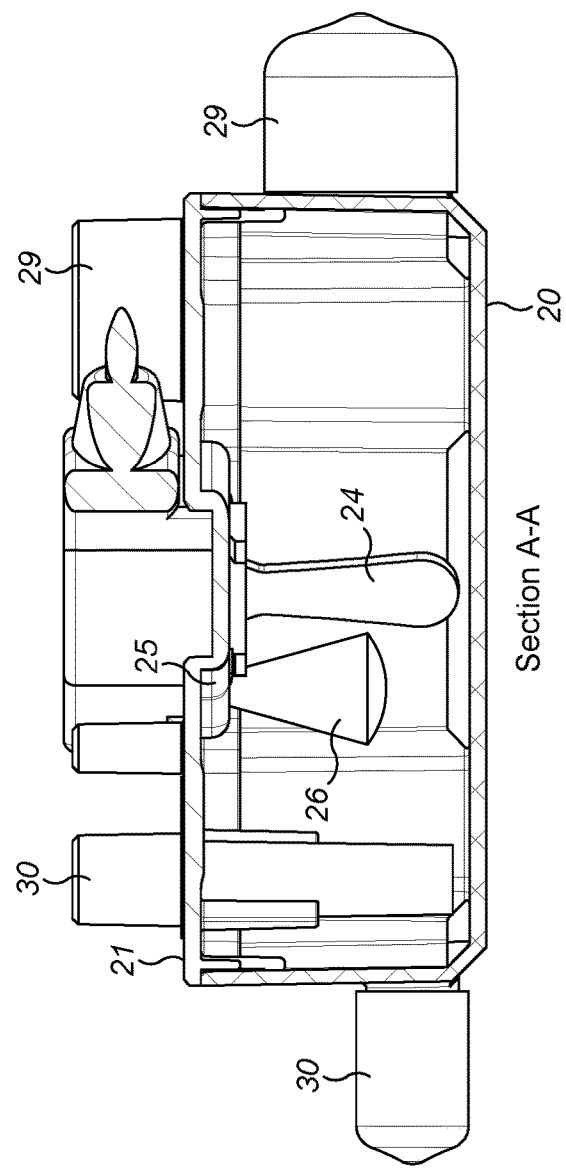
FIG. 6A is a cross section through line A-A in FIG. 6.
Figure 7:
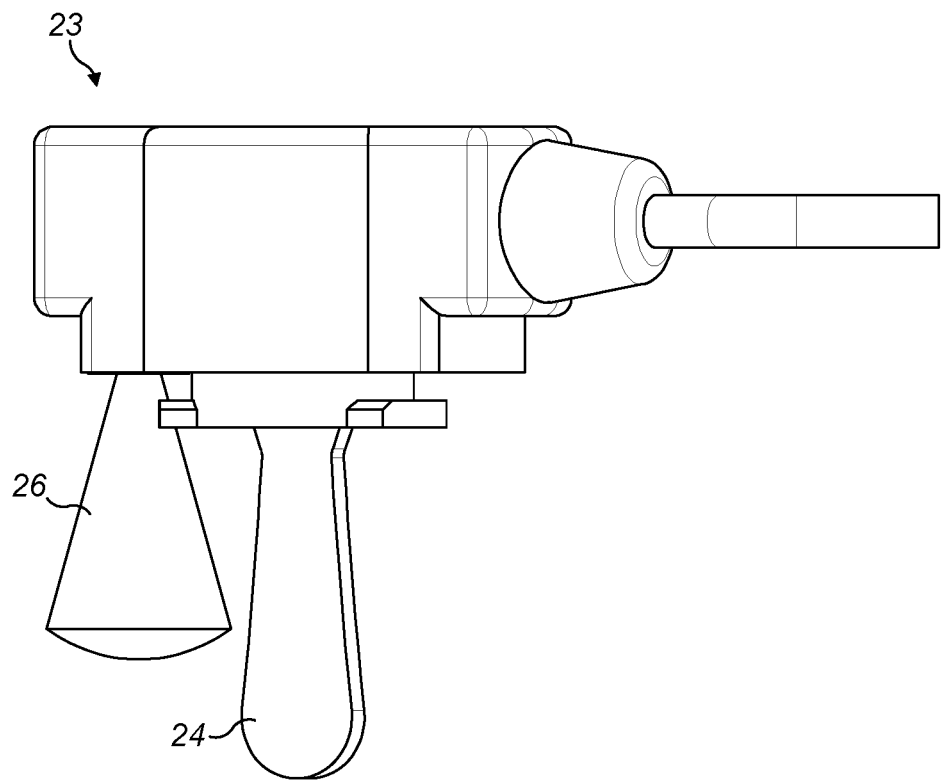
FIG. 7 is a side view of a sensor module used in the reservoir.
Figure 8:
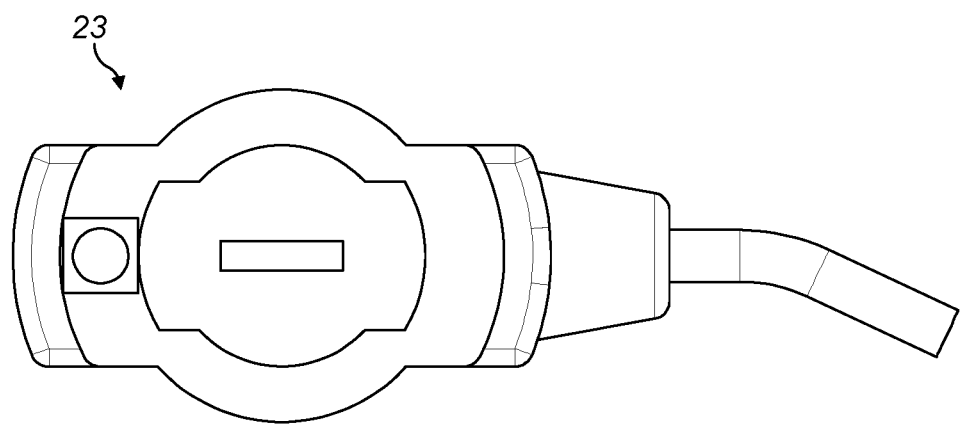
FIG. 8 is a top view of the sensor module.

This includes a sensor module 23 comprising a capacitive sensor 24 as disclosed in WO2020/120971 and a UVLED 25 mounted in the module next to the capacitive sensor. The sensor may alternatively be a thermistor or float switch. The emitted light 26 is depicted schematically in FIGS. 6A and 7. In practice this is emitted with a beam angle of 120° and will therefore impinge on most of the sensor and the bottom of the tank 20.

This serves two purposes. Firstly, it will keep the sensor 24 clean. Secondly, it will reduce or avoid a build up of sludge and bacteria in the tank 20. The bottom of the tank can be damp and cold which leads to slime building up when cold, and that can block a pump. Also, the slime dries out into "flaky" matter floating about in the condensate which again can block the pump.

Leading from the sensor module is a flex 27 via which power is transmitted at low voltage to the sensor 24 and UVLED 25. The flex 27 terminates at a plug 28. This is plugged into a socket in the pump housing as described above. The pump housing may have two sockets if separate UVLEDS are also provided for the coil as described above.

The sensor module 24 is therefore very easy to install, making is economical to introduce the UVLED into an area where it has not previously been provided, thereby providing the above advantages.

The tank 20 has a pair of inlets 29 via which condensate enters the tank 20, only one of which is used in any given application while the other is capped. Similarly there are a pair of alternative outlets 30 out of which the condensate is pumped by pump 3 to a drain when the level reaches an upper limit as detected by the sensor 12. The presence of two inlets 29 and outlets 30 allows the reservoir to be fitted into various different housing configurations. A vent 31 is provided in the lid.

The invention claimed is:

1. An evaporator unit for an air conditioning system, the unit comprising:
    a housing;
    an evaporator coil;
    an airflow path defined through the housing from an air inlet to an air outlet and passing over the evaporator coil;
    a reservoir for collecting condensate from the air passing over the evaporator coil;
    a sensor in the reservoir to detect a condensate level in the reservoir;
    a pump for pumping the condensate from, the pump having a pump housing;
    at least one ultra violet (UV) light emitting diode (LED) mounted in the housing and arranged to radiate light onto the evaporator coil and/or the sensor;
    an LED driver to supply electrical power to the at least one LED;
    a single electrical power connection connectable to a mains power source to supply mains power to the pump;
    wherein the LED driver is connected to the electrical power connection supplying power to the pump, wherein the LED driver is combined into a same driver unit as the pump such that the LED driver receives electrical power via the power source to the pump and wherein the LED driver has a plug which plugs into a corresponding socket in the pump housing.

2. An evaporator unit for an air conditioning system according to claim 1, wherein the at least one LED and LED driver are removably attached within the housing.

3. An evaporator unit for an air conditioning system according to claim 1, wherein the at least one LED emits light with a wavelength of from 100 to 280 nm.

4. An evaporator unit for an air conditioning system according to claim 1, wherein the at least one LED emits light with a wavelength of from 200 to 280 nm.

5. An evaporator unit for an air conditioning system according to claim 1, wherein the at least one LED is arranged to radiate light onto the evaporator coil and is provided in an adhesive strip.

6. An evaporator unit for an air conditioning system, the unit comprising:
    a housing;
    an evaporator coil;
    an airflow path defined through the housing from an air inlet to an air outlet and passing over the evaporator coil;
    a reservoir for collecting condensate from the air passing over the evaporator coil;

a sensor in the reservoir to detect a condensate level in the reservoir;
a pump for pumping the condensate from the housing;
at least one ultra violet (UV) light emitting diode (LED) positioned to radiate light onto the sensor;
a sensor module mounted through a lid of the reservoir, wherein the sensor and the at least one UV LED are mounted in the same sensor module, such that, in use, the light from the at least one UV LED is incident on the sensor, and wherein the UV LED forms no part of the sensor.

7. An evaporator unit according to claim 6, wherein the sensor module has a power lead with a plug at an end of the power lead furthest from the module.

8. An air conditioning system comprising an evaporator unit according to claim 6 and a compressor unit connected to the evaporator unit.

* * * * *